US008509602B2

(12) United States Patent
Ohde et al.

(10) Patent No.: US 8,509,602 B2
(45) Date of Patent: Aug. 13, 2013

(54) RECORDING CONTROL APPARATUS AND METHOD, AND PROGRAM

(75) Inventors: Junya Ohde, Kanagawa (JP); Hideki Asazu, Tokyo (JP); Takehisa Souraku, Kanagawa (JP); Yasushi Tsuruta, Tokyo (JP); Hiroyuki Ozawa, Tokyo (JP); Toshiyuki Katsumoto, Tokyo (JP); Wei Sun, Tokyo (JP)

(73) Assignee: Sony Corporation, Tokyo (JP)

( * ) Notice: Subject to any disclaimer, the term of this patent is extended or adjusted under 35 U.S.C. 154(b) by 1553 days.

(21) Appl. No.: 11/194,682

(22) Filed: Aug. 2, 2005

(65) Prior Publication Data

US 2006/0029369 A1 Feb. 9, 2006

(30) Foreign Application Priority Data

Aug. 5, 2004 (JP) ................................ P2004-229200

(51) Int. Cl.
*H04N 5/76* (2006.01)

(52) U.S. Cl.
USPC ............ 386/291; 386/296; 386/297; 386/298

(58) Field of Classification Search
USPC ..... 386/1, 46, 83, 95, 96, 124–126, 239–248, 386/291–299; 725/37–52, 110–124
See application file for complete search history.

(56) References Cited

U.S. PATENT DOCUMENTS

| 4,833,610 | A | * | 5/1989 | Zamora et al. .......................... 1/1 |
| 5,251,324 | A | * | 10/1993 | McMullan, Jr. ................. 725/14 |
| 5,519,443 | A | * | 5/1996 | Salomon et al. .............. 348/467 |
| 5,526,130 | A | * | 6/1996 | Kim .............................. 386/244 |
| 5,956,455 | A | | 9/1999 | Hennig |
| 6,230,324 | B1 | * | 5/2001 | Tomita et al. .................... 725/51 |
| 6,344,878 | B1 | * | 2/2002 | Emura .......................... 348/460 |
| 6,489,999 | B1 | * | 12/2002 | Okabe ........................... 348/460 |
| 6,973,663 | B1 | * | 12/2005 | Brown et al. ................... 725/39 |
| 7,545,445 | B2 | * | 6/2009 | Agusa et al. .................... 348/732 |
| 2003/0023987 | A1 | * | 1/2003 | Hiramoto et al. ............. 725/141 |

(Continued)

FOREIGN PATENT DOCUMENTS

| EP | 0 271 664 | 6/1988 |
| EP | 1 058 454 | 12/2000 |

(Continued)

OTHER PUBLICATIONS

Steven S. Skiena: "Set and String Problems," The Algorithm Design Manual, Springer-Verlag, New York, 1998, Chapters 8.7.3, 8.7.4 and 8.7.8 (pp. 403-425).

(Continued)

*Primary Examiner* — Hung Dang
(74) *Attorney, Agent, or Firm* — Finnegan, Henderson, Farabow, Garrett & Dunner, L.L.P.

(57) ABSTRACT

A recording control apparatus for controlling the recording of content of broadcast programs includes the following elements. An acquisition unit acquires electronic program guide data concerning the broadcast programs. A detector detects the title of a broadcast program from reserve-recording data indicating a recording reservation of the broadcast program. A calculator calculates the similarity between the title of the broadcast program detected by the detector and the title of the broadcast program indicated in the electronic program guide data acquired by the acquisition unit. A changing unit changes the reserve-recording data by using the electronic program guide data on the basis of the similarity calculated by the calculator.

14 Claims, 13 Drawing Sheets

(56) References Cited

U.S. PATENT DOCUMENTS

| | | | |
|---|---|---|---|
| 2003/0142957 A1* | 7/2003 | Young et al. | 386/83 |
| 2003/0200545 A1 | 10/2003 | Nakada | |
| 2006/0168622 A1* | 7/2006 | Poll et al. | 725/46 |
| 2007/0058931 A1* | 3/2007 | Ohnuma et al. | 386/83 |

FOREIGN PATENT DOCUMENTS

| | | |
|---|---|---|
| EP | 1 292 137 | 3/2003 |
| JP | 07-073197 | 3/1995 |
| JP | 2000-278623 | 10/2000 |
| JP | 2003-046921 | 2/2003 |
| JP | 2004-7757 | 1/2004 |
| JP | 2004-134858 * | 4/2004 |
| WO | WO 97/49237 | 12/1997 |

OTHER PUBLICATIONS

Communication pursuant to Article 94(3) EPC mailed Aug. 13, 2009 in corresponding EP Application No. 05 254 847.6-2202 (3 pages).

* cited by examiner

FIG. 4

EXTRACTED TITLE: KO-SU-ME-NO-MA-JUTSU

TITLE OBTAINED FROM EPG: KON-YA-SU-TA-TO-TUCHI-NO-UTSUWA

LCS (LONGEST COMMON SUBSEQUENCE): SU + NO

SIMILARITY (LCS LENGTH) CALCULATED IN RELATED ART: 1 + 1 = 2

SIMILARITY CALCULATED IN EMBODIMENT OF THE PRESENT INVENTION: $1^2 + 1^2 = 2$

FIG. 5

| EXTRACTED TITLE | MIZU-IRO-TEI-KI-BIN |
|---|---|
| TITLE OBTAINED FROM EPG | MIZU-IRO |
| LCS (LONGEST COMMON SUBSEQUENCE) | MIZU-IRO |
| SIMILARITY (LCS LENGTH) CALCULATED IN RELATED ART | 2 =2 |
| SIMILARITY CALCULATED IN EMBODIMENT OF THE PRESENT INVENTION | $2^2$ =2 |

FIG. 6

EXTRACTED TITLE: NAKA-YAMA-MASA-HIRO-NO-SUI-YO-BI-NO-TSU-MA-TA-CHI-HE

TITLE OBTAINED FROM EPG: NAKA-YAMA-MASA-HIRO-NO-SU-I-TSU-MA

LCS (LONGEST COMMON SUBSEQUENCE): NAKA-YAMA-MASA-HIRO-NO + TSU-MA

SIMILARITY (LCS LENGTH) CALCULATED IN RELATED ART: 5 + 2 = 7

SIMILARITY CALCULATED IN EMBODIMENT OF THE PRESENT INVENTION: $5^2 + 2^2 = 29$

RECORDING CONTROL APPARATUS AND METHOD, AND PROGRAM

CROSS REFERENCES TO RELATED APPLICATIONS

The present invention contains subject matter related to Japanese Patent Application JP 2004-229200 filed in the Japanese Patent Office on Aug. 5, 2004, the entire contents of which are incorporated herein by reference.

BACKGROUND OF THE INVENTION

1. Field of the Invention

The present invention relates to recording control apparatuses and methods, and programs, and more particularly, to a recording control apparatus and method, and a program in which, upon detecting that, for example, the broadcast time of a reserved television program, has been changed, the reservation of the program is changed on the basis of the detection result.

2. Description of the Related Art

In many television program recorders, recording reservations can be set by the use of electronic program guide (EPG) data represented by a broadcast signal. One of such recorders is disclosed in, for example, Japanese Unexamined Patent Application Publication No. 2004-7757.

SUMMARY OF THE INVENTION

Generally, television programs are formed on a weekly basis. For example, drama series broadcast at 21:00 on Monday of one week are broadcast at the same time on the following Monday. Accordingly, in known recorders, the reserve recording of the program on channel 8 from 21:00 to 22:00 every Monday can be performed.

However, for example, for the final episode of a drama, it is not unusual that the broadcast start time is set earlier than usual or the broadcast length is extended. In this case, if the above-described reserve recording, i.e., recording the program on channel 8 from 21:00 to 22:00 every Monday, is performed without being changed, the beginning part or the ending part of the program may not be recorded.

In view of this background, it is desirable to change a reserve-recording time in accordance with a change in, for example, the broadcast time of a record-reserved program.

According to an embodiment of the present invention, there is provided a recording control apparatus for controlling the recording of content of broadcast programs. The recording control apparatus includes: acquisition means for acquiring electronic program guide data concerning the broadcast programs; detection means for detecting the title of a broadcast program from reserve-recording data indicating a recording reservation of the broadcast program; calculation means for calculating the similarity between the title of the broadcast program detected by the detection means and the title of the broadcast program indicated in the electronic program guide data acquired by the acquisition means; and changing means for changing the reserve-recording data by using the electronic program guide data on the basis of the similarity calculated by the calculation means.

The above-described calculation means may calculate the similarity on the basis of a longest common subsequence (LCS) length of the title of the broadcast program detected by the detection means and the title of the broadcast program indicated in the electronic program guide data.

The calculation means may calculate, as the similarity, the square sum of LCS lengths of the title detected by the detection means and the title of the broadcast program indicated in the electronic program guide data.

The calculation means may calculate the similarity so that the similarity becomes greater as the LCS length of the title detected by the detection means and the title of the broadcast program indicated in the electronic program guide data is longer.

The calculation means may calculate the similarity immediately before the broadcast date of the broadcast program indicated in the reserve-recording data.

The calculation means may calculate the similarity after performing a preprocess for removing a predetermined character from the title detected by the detection means and the title of the broadcast program indicated in the electronic program guide data or for converting the predetermined character into another character.

The changing means may change the reserve-recording data by using the electronic program guide data on the basis of at least one of the differences in the broadcast start time and in the program length between the broadcast program indicated in the reserve-recording data and the broadcast program indicated in the electronic program guide data.

The changing means may change the reserve-recording data when the similarity calculated by the calculation means is greater than or equal to a predetermined value.

The detection means may also detect the title of a recorded broadcast program.

The recording control apparatus according to an embodiment of the present invention may further include: selection means for selecting a broadcast program related to the recorded broadcast program on the basis of the similarity calculated by the calculation means; and generation means for generating reserve-recording data indicating a recording reservation of the broadcast program selected by the selection means.

The selection means may select the broadcast program related to the recorded broadcast program on the basis of at least one of the differences in the broadcast date, the broadcast start time, and the program length between the recorded broadcast program and the broadcast program indicated in the electronic program guide data.

According to an embodiment of the present invention, there is provided a recording control method for controlling the recording of content of broadcast programs. The recording control method includes the steps of: acquiring electronic program guide data concerning the broadcast programs; detecting the title of a broadcast program from reserve-recording data indicating a recording reservation of the broadcast program; calculating the similarity between the title of the broadcast program detected in the detecting step and the title of the broadcast program indicated in the electronic program guide data acquired in the acquiring step; and changing the reserve-recording data by using the electronic program guide data on the basis of the similarity calculated in the calculating step.

According to an embodiment of, the present invention, there is provided a program for controlling the recording of content of broadcast programs. The program allows a computer to execute processing including the steps of: acquiring electronic program guide data concerning the broadcast programs; detecting the title of a broadcast program from reserve-recording data indicating a recording reservation of the broadcast program; calculating the similarity between the title of the broadcast program detected in the detecting step and the title of the broadcast program indicated in the electronic program guide data acquired in the acquiring step; and changing the reserve-recording data by using the electronic program guide data on the basis of the similarity calculated in the calculating step.

According to an embodiment of the present invention, the title of a broadcast program is detected from reserve-recording data indicating a recording reservation of the broadcast program, and the similarity between the detected title and the title of the broadcast program indicated in the electronic program guide data is calculated. Based on the calculated similarity, the reserve-recording data is changed by using the electronic program guide data.

According to an embodiment of the present invention, content of broadcast programs can be reserve-recorded. Additionally, the reserved broadcast time can be changed in accordance with a change in, for example, the broadcast time, of a reserved program.

BRIEF DESCRIPTION OF THE DRAWINGS

FIGS. 4, 5, and 6 illustrate calculation methods for the similarity between two titles according to an embodiment of the present invention;

DESCRIPTION OF THE PREFERRED EMBODIMENTS

Before describing an embodiment of the present invention, the correspondence between the features of the claims and the specific elements disclosed in an embodiment of the present invention is discussed below. This description is intended to assure that specific elements disclosed in an embodiment supporting the claimed invention are described in this specification. Thus, even if an element in an embodiment is not described as relating to a certain feature of the present invention, that does not necessarily mean that the element does not relate to that feature of the claims. Conversely, even if an element is described herein as relating to a certain feature of the claims, that does not necessarily mean that the element does not relate to other features of the claims.

Furthermore, this description should not be construed as restricting that all the aspects of the invention disclosed in an embodiment are described in the claims. That is, the description does not deny the existence of aspects of the present invention that are described in an embodiment but not claimed in the invention of this application, i.e., the existence of aspects of the present invention that in future may be claimed by a divisional application, or that may be additionally claimed through amendments.

Figure 1:
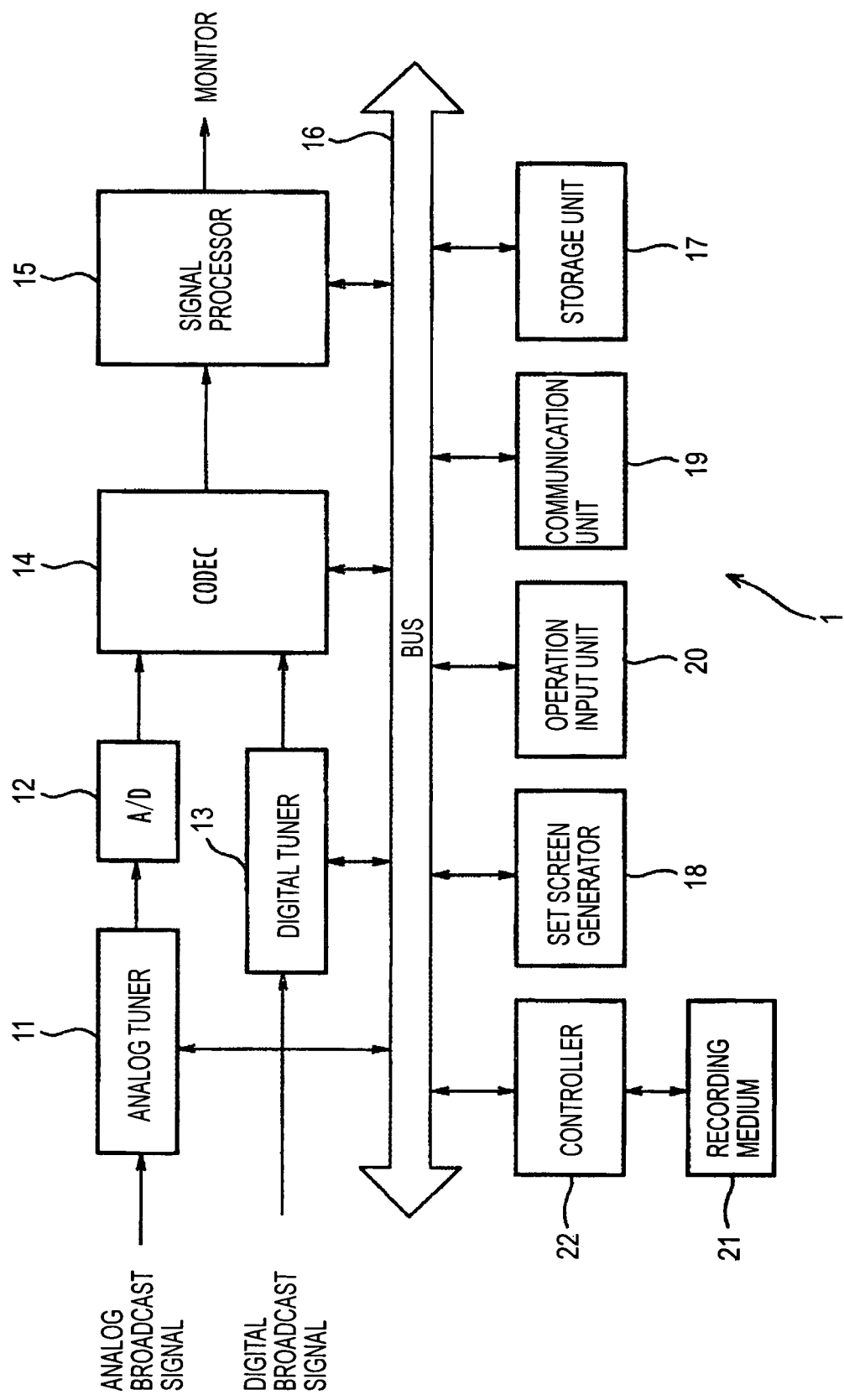
FIG. 1 is a block diagram illustrating an example of the configuration of a video recorder according to an embodiment of the present invention.
Figure 2:
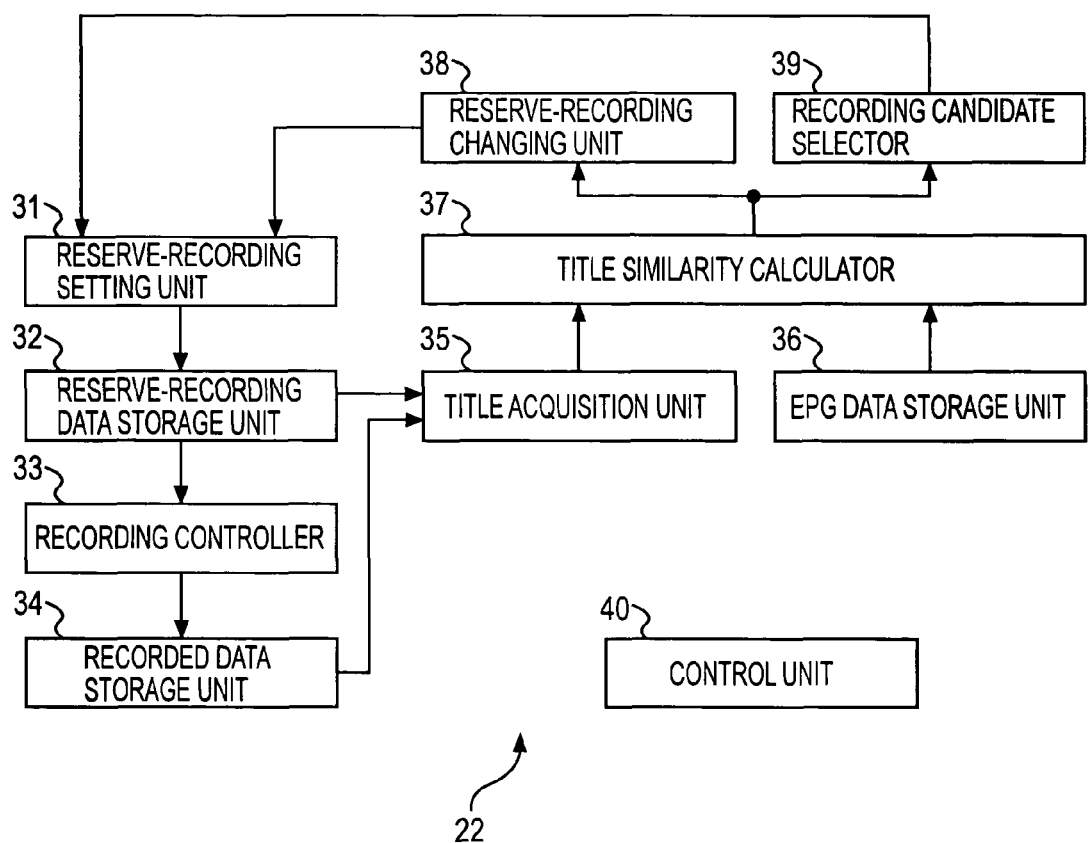
FIG. 2 is a block diagram illustrating an example of the detailed configuration of a controller used in the video recorder shown in FIG. 1.

The recording control apparatus (for example, a video recorder 1 shown in FIG. 1) according to an embodiment of the present invention includes: acquisition means (for example, an electronic program guide (EPG) data storage unit 36 shown in FIG. 2) for acquiring electronic program guide data (for example, EPG data) concerning the broadcast programs; detection means (for example, a title acquisition unit 35 shown in FIG. 2) for detecting the program title of a broadcast program from reserve-recording data indicating a recording reservation of the broadcast program; calculation means (for example, a title similarity calculator 37 shown in FIG. 2) for calculating the similarity between the title of the broadcast program detected by the detection means and the title of the broadcast program indicated in the electronic program guide data acquired by the acquisition means; and changing means (for example, reserve-recording changing unit 38 shown in FIG. 2) for changing the reserve-recording data by using the electronic program guide data on the basis of the similarity calculated by the calculation means.

The recording control apparatus according to an embodiment of the present invention may further include: selection means (recording candidate selector 39 shown in FIG. 2) for selecting a broadcast program related to the recorded broadcast program on the basis of the similarity calculated by the calculation means; and generation means (for example, reserve-recording setting unit 31 shown in FIG. 2) for generating reserve-recording data indicating a recording reservation of the broadcast program selected by the selection means.

Figure 8:
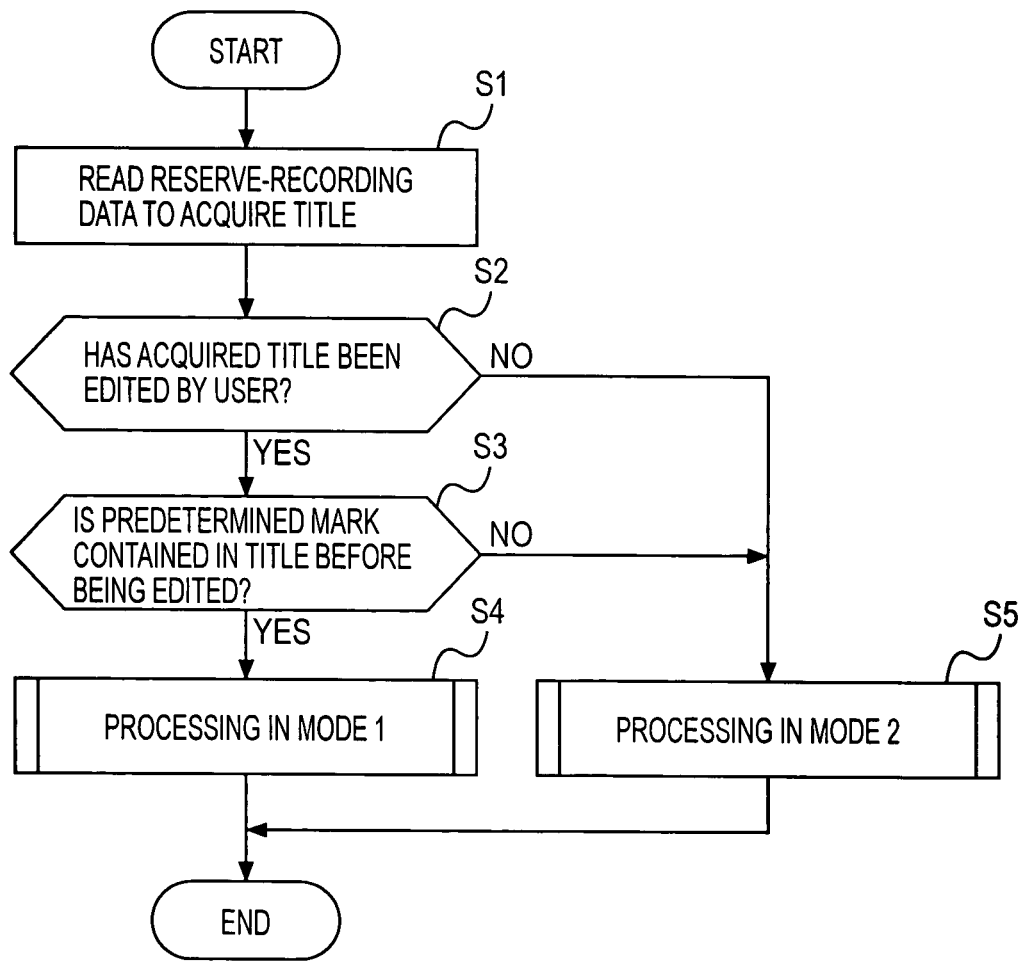
FIG. 8 is a flowchart illustrating the reserve-recording program tracking processing.
Figure 9:
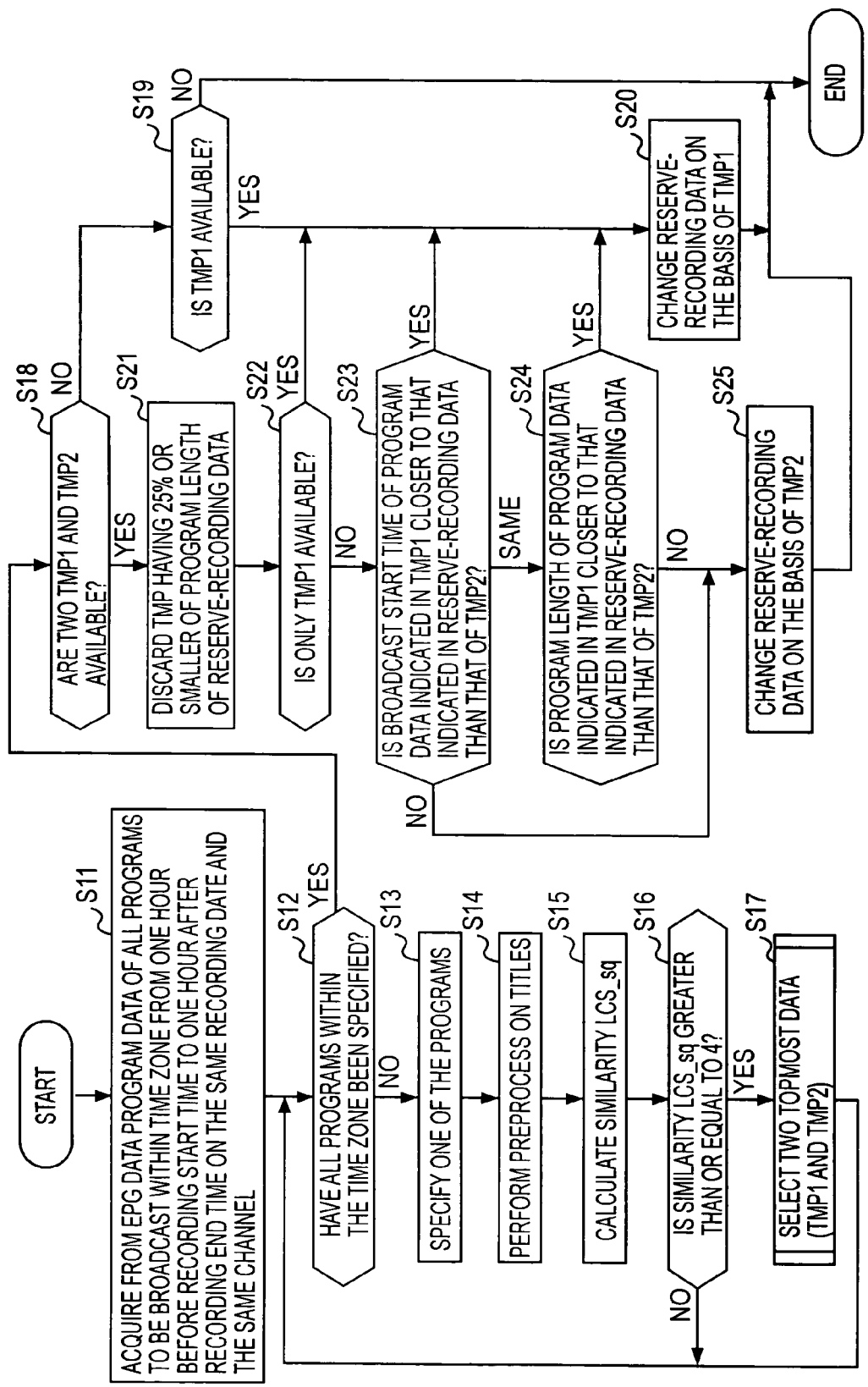
FIG. 9 is a flowchart illustrating processing in mode 1 in step S4 in FIG. 8.

The recording control method according to an embodiment of the present invention includes the steps of: acquiring electronic program guide data concerning the broadcast programs (for example, step S11 shown in FIG. 9); detecting the program title of a broadcast program from reserve-recording data indicating a recording reservation of the broadcast program (for example, step S1 shown in FIG. 8); calculating the similarity between the title of the broadcast program detected in the detecting step and the title of the broadcast program indicated in the electronic program guide data acquired in the acquiring step (for example, step S15 shown in FIG. 9); and changing the reserve-recording data by using the electronic program guide data on the basis of the similarity calculated in the calculating step (for example, step S20 shown in FIG. 9).

The correspondence between the features recited in the program claim and the specific elements disclosed in an embodiment of the present invention is similar to that between the features recited in the method claim and the specific elements disclosed in an embodiment of the present invention, and an explanation thereof is thus omitted.

The present invention is described in detail below with reference to the accompanying drawings through illustration of an embodiment.

A video recorder 1 shown in FIG. 1 according to an embodiment of the present invention receives and records television programs according to preset recording reservations. The video recorder 1 also plays back recorded televisions programs in response to an operation performed by a user, and outputs the resulting video signal and audio signal to, for example, a television receiver (not shown). Additionally, the video recorder 1 changes a recording reservation of a program upon detecting that the broadcast time of the reserved program has been changed (hereinafter such processing referred to as "recording-reserved program tracking processing") or sets the subsequent recording reservation of a recorded program upon detecting the subsequent broadcasting of the recorded program (hereinafter such processing referred to as "subsequent reserve processing").

In the video recorder 1, an analog tuner 11 receives an analog broadcast signal, for example, a terrestrial analog broadcast signal or a broadcasting satellite (BS) analog broadcast signal, and outputs the video signal and audio signal of a television program obtained from the broadcast signal to an analog-to-digital (A/D) converter 12. The analog tuner 11 receives EPG data contained in the analog broadcast signal and outputs the received EPG data to a controller 22 via a bus 16. The A/D converter 12 converts the video signal and audio signal supplied from the analog tuner 11 into digital signals and outputs them to a CODEC 14.

A digital tuner 13 receives a digital broadcast signal, for example, a terrestrial digital broadcast signal, a BS digital signal, or a communication satellite (CS) digital broadcast signal, and outputs the coded data that can play back the video and sound of a television signal obtained from the broadcast signal to the CODEC 14 or a storage unit 17 via the bus 16. The digital tuner 13 also receives EPG data contained in the digital broadcast signal and outputs the received EPG data to the controller 22 via the bus 16.

During a recording operation, the CODEC 14 codes the digital video signal and audio signal supplied from the A/D converter 12 according to an MPEG2 method, and outputs the resulting coded data to the storage unit 17 via the bus 16. During a playback operation, the CODEC 14 decodes coded data read and supplied from the storage unit 17 via the bus 16 and outputs the resulting video signal and audio signal to a signal processor 15. The CODEC 14 can also output the digital video signal and audio signal supplied from the A/D converter 12 directly to the signal processor 15, or can decode the coded data input from the digital tuner 13 and output the resulting video signal and audio signal to the signal processor 15.

The signal processor 15 performs predetermined signal processing on the video signal and audio signal supplied from the CODEC 14, and outputs the resulting video signal and audio signal to the monitor of, for example, a television receiver. The signal processor 15 also performs predetermined signal processing on a video signal indicating a screen to be set input from a set screen generator 18 to output the resulting video signal to, for example, a television receiver.

The storage unit 17, which is a drive for reading or writing data from or into a recording medium, such as a hard disk or a digital versatile disk (DVD), stores coded data input from the CODEC 14 via the bus 16. The storage unit 17 also reads out the stored data and outputs it to the CODEC 14 via the bus 16.

The set screen generator 18 generates a video signal indicating a set screen, such as an EPG, for setting recording reservations, and outputs the generated video signal to the signal processor 15 via the bus 16.

A communication unit 19 connects to a predetermined server via a network (not shown), such as the Internet, to obtain EPG data. An operation input unit 20, which is, for example, a remote controller or a button provided for the main unit of the video recorder 1, generates an operation signal in accordance with an operation performed by the user and outputs the generated operation signal to the controller 22 via the bus 16.

The controller 22 controls the individual elements of the video recorder 1 in response to the operation signal input from the operation input unit 20 via the bus 16 according to a control program recorded on a recording medium 21. In the controller 22, the EPG data received by the analog tuner 11 or the digital tuner 13 or the EPG data obtained by the communication unit 19 is stored.

FIG. 2 illustrates an example of the detailed configuration of the controller 22. A reserve-recording setting unit 31 generates reserve-recording data concerning the reserve recording of television programs in accordance with an operation signal corresponding to an operation performed by the user by using the EPG data, and outputs the generated reserve-recording data to a reserve-recording data storage unit 32. The reserve-recording data includes information concerning programs to be recorded, such as broadcast channels, broadcast dates, broadcast start times, broadcast end times, program lengths, and program titles. The program titles contained in the reserve-recording data are extracted from the EPG data or are input by the user. The user can edit the program titles contained in the reserve-recording data. If the user edits the program titles, the program titles before being edited are also stored. Also, if the user sets a recording reservation by inputting only the broadcast channel, the broadcast start time, and the program length, the program title corresponding to the reservation is detected from the EPG data and is added to the reserve-recording data.

The program title indicated in the EPG data is not necessarily a proper program title, and is often abbreviated. Even for the same program, it may be indicated by a proper name, or a first abbreviated name or a second abbreviated name, i.e., the program title may be changed every time the EPG data is updated.

The reserve-recording setting unit 31 changes the reserve-recording data stored in the reserve-recording data storage unit 32 in response to a request from a reserve-recording changing unit 38. The reserve-recording setting unit 31 also generates reserve-recording data in response to a request from a recording candidate selector 39 and outputs the generated reserve-recording data to the reserve-recording data storage unit 32.

The reserve-recording storage unit 32 stores the reserve-recording data generated by the reserve-recording setting unit 31. A recording controller 33 controls the individual elements of the video recorder 1 so that the television programs can be recorded in accordance with the reserve-recording data stored in the reserve-recording data storage unit 32. The recording controller 33 also generates recorded data concerning recorded television programs when recording is finished and outputs the generated recorded data to a recorded data storage unit 34. As in the reserve-recording data, the recorded data includes information concerning the recorded programs, such as broadcast channels, broadcast dates, broadcast start and end times, program lengths, and program titles. The recorded data storage unit 34 stores the recorded data generated by the recording controller 33.

A title acquisition unit 35 extracts the program title from the reserve-recording data in the recording-reserved program tracking processing, which is discussed below, or extracts the program title from the reserved data in the subsequent reserve processing, which is also discussed below, and outputs the extracted program title to a title similarity calculator 37. An EPG data storage unit 36 stores the latest EPG data obtained from a broadcast signal or via the Internet, and supplies program data (program titles, broadcast channels, broadcast start times, broadcast end times, program lengths, etc.) of television programs in response to a request from the title similarity calculator 37.

The title similarity calculator 37 calculates the similarity between the program title of a recording-reserved program or a recorded program obtained from the title acquisition unit 35 and the program title satisfying predetermined conditions (discussed below) supplied from the EPG data storage unit 36. The calculation of the similarity in the program title is to obtain the latest information (for example, precise broadcast time) concerning the recording-reserved program or the information (for example, broadcast time) concerning the subsequent broadcasting of the recorded program. The title similarity calculator 37 then outputs the calculation result to the reserve-recording changing unit 38 and the recording candidate selector 39.

The reserve-recording changing unit 38 determines on the basis of the calculated similarity and the program data input from the title similarity calculator 37 whether the broadcast time of the recording-reserved program has been changed. If so, the reserve-recording changing unit 38 requests the reserve-recording setting unit 31 to change the recording reservation in accordance with the detection result. The recording candidate selector 39 selects the subsequent broadcasting of the reserved program on the basis of the calculated similarity and the program data input from the title similarity calculator 37, and requests the reserve-recording setting unit 31 to reserve the recording of the selected subsequent broadcasting. Instead of making a reservation request, the recording candidate selector 39 may simply provide the selection result to the user. A control unit 40 controls the individual elements of the controller 22.

A description is now given of the calculation of the similarity between the program title extracted by the title acquisition unit 35 and the program title obtained from the EPG data by the title similarity calculator 37. The similarity is calculated based on the longest common subsequence (LCS) length between two program titles, and the similarity becomes greater as the LCS length is longer. The LCS is a common portion in which a character string formed of at least one character appears in the same order between two program titles.

Figure 3:
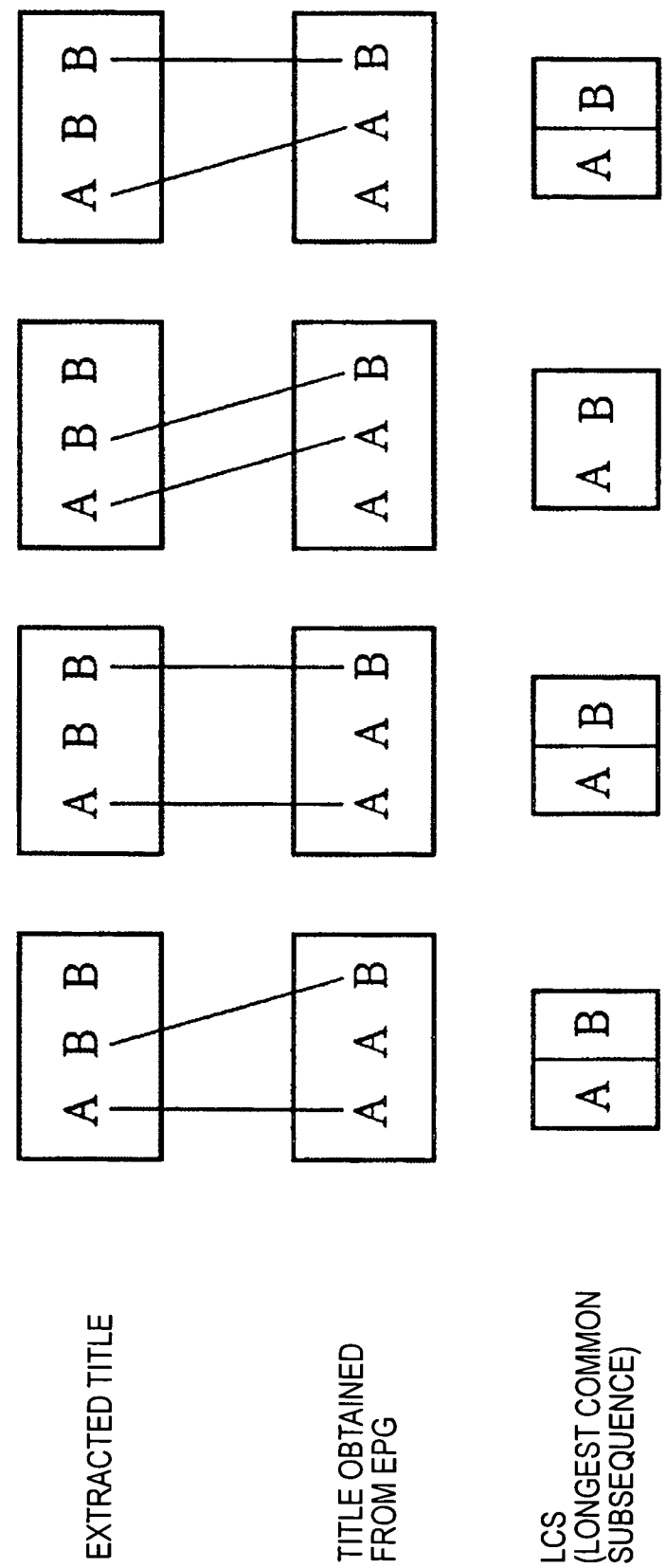
FIG. 3 illustrates the longest common subsequence (LCS) between two program titles.

For example, when calculating the LCS length between the extracted program title "ABB" and the program title "AAB" obtained from the EPG, there are four patterns for associating the two titles. In the first pattern at the leftmost side in FIG. 3, there are two common portions, i.e., the common portion A and the common portion B, that is, the LCS length becomes 2 (=1+1). In the second pattern right adjacent to the first pattern, there are also two common portions, i.e., the common portion A and the common portion B, that is, the LCS length becomes 2 (=1+1). In the third pattern right adjacent to the second pattern, there is one common portion, i.e., the common portion AB, that is, the LCS length becomes 2 (=1+1). In the rightmost fourth pattern, there are two common portions, i.e., the common portion A and the common portion B, that is, the LCS length becomes 2 (=1+1).

In this manner, although there are a plurality of patterns for associating the common portions of two program titles, the LCS length can be uniquely determined. However, if the LCS length is directly used as the similarity between two program titles, the following problem is presented.

As shown in FIG. 4, for example, the common portions between different program titles, i.e., the extracted program title and the program title obtained from the EPG, "Ko-su-me-no-ma-jutsu" and "Kon-ya-su-ta-to-tuchi-no-utsuwa" (in those examples, syllables in Japanese words are hyphenated, and the same applies to the following examples of Japanese words) are "su" and "no", that is, the LCS length becomes 2 (=1+1). As shown in FIG. 5, for example, the common portion between the extracted title "Mizu-iro-tei-ki-bin" and the title obtained from the EPG "Mizu-iro" is "mizu-iro", that is, the LCS length becomes 2.

As is apparent from the comparison between FIGS. 4 and 5, when the common portion between the two program titles is short, in particular, when the LCS length is about 2, the two programs may be different (the case shown in FIG. 4) or may be the same. Accordingly, if the LCS length is used as the similarity, which is the criterion for determining whether two program titles indicate the same program, it is difficult to judge whether the two program titles are the same in the case where the common portion between the two program titles is short, for example, where the LCS length is about 2.

Accordingly, in an embodiment of the present invention, the square sum of the length of a common portion is used as the similarity so that the similarity becomes larger as the common portion is longer. The similarity used in this embodiment is hereinafter indicated as "LCS_sq". According to this calculation method, the common portions between different program titles shown in FIG. 4, i.e., "Ko-su-me-no-ma-jutsu" and "Kon-ya-su-ta-to-tuchi-no-utsuwa", are "su" and "no", and thus, the similarity LCS_sq becomes 2 (=$1^2+1^2$). The common portion between different program titles shown in FIG. 5, i.e., "Mizu-iro-tei-ki-bin" and "Mizu-iro", is "Mizu-iro", and thus, the similarity LCS_sq becomes 4 (=$2^2$). In this manner, according to the calculation method for the similarity LCS_sq used in an embodiment of the present invention, the similarity of the case shown in FIG. 4 can be differentiated from that shown in FIG. 5 even though the LCS lengths are the same.

However, if the square sum of the length of a common portion is simply used as the similarity, the value of the similarity becomes different depending on which portion of the program titles is considered as the common portion. Thus, to uniquely determine the similarity, the pattern in which the common portion at the leading parts of the program titles becomes the longest is used for calculating the similarity LCS_sq.

For example, in the titles indicating the same program shown in FIG. 6, i.e., "Naka-yama-masa-hiro-no-sui-yo-bi-no-tsu-ma-ta-chi-he" and "Naka-yama-masa-hiro-no-su-i-tsu-ma", the common portions are "Naka-yama-masa-hiro-no" and "tsu-ma", that is, the similarity LCS_sq is calculated to be 29 (=$5^2+2^2$).

The square sum of the lengths of common portions may be calculated for all possible patterns for combinations of common portions between two program titles, and the maximum square sum is used as the similarity LCS_sq between the two program titles. In this case, however, the computation amount is considerably increased, and on the other hand, the detection precision for the same program is not significantly increased.

Figure 7:
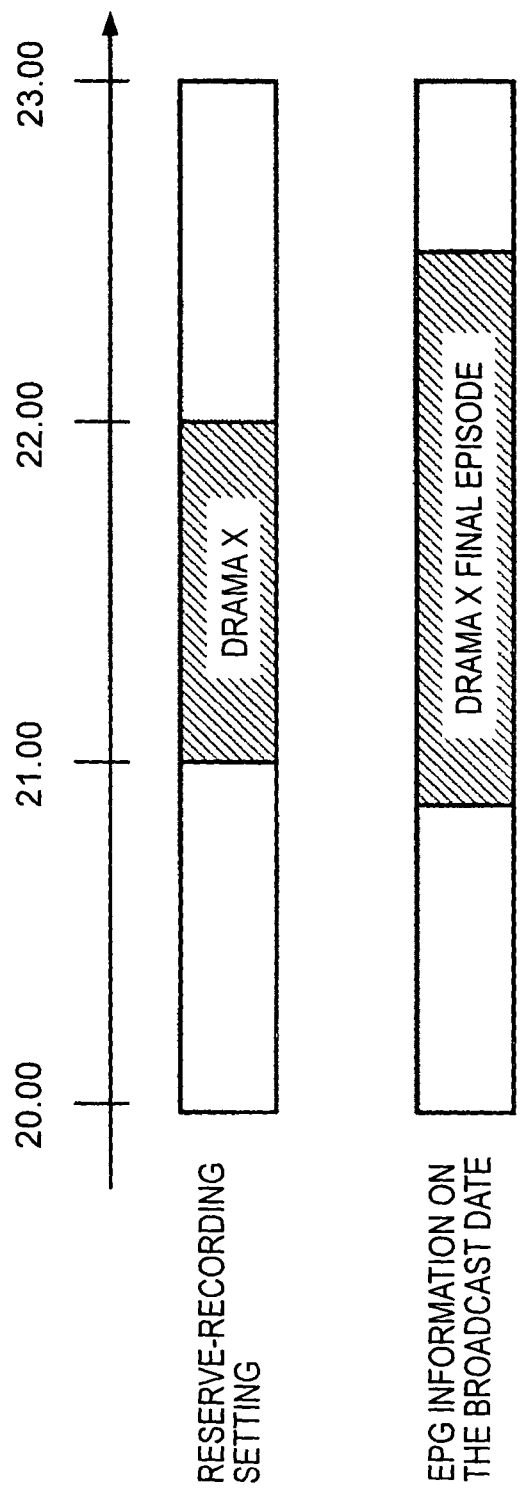
FIG. 7 illustrates an overview of reserve-recording program tracking processing.

The recording-reserved program tracking processing is described in detail below. FIG. 7 illustrates an overview of the recording-reserved program tracking processing. It is now assumed, for example, that a drama X broadcast from 21:00 to 22:00 every Monday is reserve-recorded. However, if the subsequent broadcasting of the drama X is the final episode, the broadcast start time may be set earlier or the program length may be extended. Such a change in the broadcast time is not always reflected in the EPG data long before the broadcast date, and it is more likely that it is reflected in the EPG data immediately before the broadcast date.

Accordingly, in the recording-reserved program tracking processing, immediately before, for example, one day before, the recording-reserved program broadcast date when the information concerning the reserved programs are more likely to be precisely reflected in the EPG data, the reserved broadcast start time is compared with the broadcast start time indicated in the latest EPG data, and the recording reservation is changed on the basis of the comparison result.

The recording-reserved program tracking processing is described in detail below with reference to the flowcharts of FIGS. 8 through 11. In the recording-reserved program tracking processing, at a predetermined time (for example, immediately after the latest EPG data is obtained) every day, the reserve-recording data stored in the reserve-recording data storage unit 32 immediately before the broadcast time, for example, the reserve-recording data within 24 hours before the broadcast time, are specified one by one by the control unit 40.

In step S1, the title acquisition unit 35 reads the reserve-recording data specified by the control unit 40 from the reserve-recording storage unit 32, and acquires the program title indicated in the reserve-recording data.

In step S2, the title acquisition unit 35 determines whether the program title acquired in step S1 has been edited by the user after the reserve-recording data was generated. If the program title has been edited by the user, it is assumed that the program title before being edited is also stored. If it is determined in step S2 that the program title has been edited, the process proceeds to step S3 to determine whether a predetermined mark (for example, ◊) is contained in the program title before being edited by the user. If a predetermined mark is contained in the program title, the process proceeds to step S4 in which processing in mode 1 is performed. In contrast, if a predetermined mark is not contained in the program title, the process proceeds to step S5 in which processing in mode 2 is performed.

The predetermined mark indicates that the program title indicated in the EPG data is integrated from two program titles. For example, a relatively short program title BBB is added to a program title AAAAA, resulting in the program title AAAAA ◊ BBB. In this case, the two programs are integrally reserve-recorded. In the EPG data immediately before the broadcast date of the two programs, the program title AAAAA ◊ BBB may be indicated separately as two independent program titles AAAAA and BBB.

If the program title AAAAA ◊ BBB indicated in the EPG data when the reservation was made has been edited by the user, the program title indicated in the current reserve-recording data may have been edited to AAAAA or BBB. This means that the user may wish to record only one of the two programs. Accordingly, in the processing in mode 1, the processing order is determined so as to satisfy a request from the user as described above more easily than in the processing in mode 2.

Details of the processing in mode 1 in step S4 are given below with reference to the flowchart of FIG. 9.

In step S11, the title similarity calculator 37 obtains from the EPG data storage unit 36 program data of all programs to be broadcast on the same broadcast date and the same channel as those indicated in the reserve-recording data and to be broadcast in a time zone from a predetermined time (for example, one hour) before the broadcast start time (recording start time) to a predetermined time (for example, one hour) after the broadcast end time (recording end time) indicated in the reserve-recording data.

In step S12, it is determined whether all the program data obtained in step S11 have been specified. If it is determined in step S12 that not all the program data have been specified, the process proceeds to step S13. In step S13, the control unit 40 specifies one of the unspecified program data.

In step S14, the title similarity calculator 37 performs a title preprocess on the program title indicated in the reserve-recording data and the program title indicated in the specified program data. If the program title indicated in the reserve-recording data has been subjected to the title preprocess, the preprocess on that program title is omitted.

The title preprocess includes the removal of external characters, special characters, and subtitles, and conversion of special external characters.

In removing external characters, characters that are likely to be changed or omitted every time the EPG data is updated and that are not so meaningful to specify the program, for example, "new" and "end", are removed.

In removing special characters, characters that are not so meaningful to specify the program, for example, "!" and "1", are removed.

In converting special external characters, special external characters that are meaningful to specify the program, for example, "[M]", are converted to a normal character "M".

In removing subtitles, subtitles that are likely to be changed every broadcast time, for example, 'Murder at Onsen' of "Friday Mystery Drama 'Murder at Onsen'", are removed.

In step S15, the title similarity calculator 37 calculates the similarity LCS_sq (square sum of the lengths of the common portions) between the program title indicated in the reserve-recording data and the specified program data subjected to the title preprocess.

In step S16, the title similarity calculator 37 determines whether the calculated similarity LCS_sq is greater than or equal to a predetermined threshold TH1 (for example, 4). If the calculated similarity LCS_sq is smaller than the predetermined threshold TH1, the process returns to step S12, and step S12 and the subsequent steps are repeated.

If it is determined in step S16 that the calculated similarity LCS_sq is greater than or equal to the predetermined threshold TH1, the process proceeds to step S17. In step S17, the title similarity calculator 37 outputs, together with the specified program data, the calculated similarity LCS_sq to the reserve-recording changing unit 38. The reserve-recording changing unit 38 then determines whether the similarity LCS_sq of the program data input from the title similarity calculator 37 is greater than that of either of the two topmost data (i.e., the two topmost data TMP1 and TMP2 that are most likely to be the same as the program indicated in the reserve-recording data). If the similarity LCS_sq of the program data input from the title similarity calculator 37 is found to be greater than that of the topmost data TMP1 or TMP2, the corresponding topmost data is updated by the program data input from the title similarity calculator 37. Conversely, if the similarity LCS_sq of the program data input from the title similarity calculator 37 is not greater than that of either of the two topmost data, it is discarded.

Figure 10:
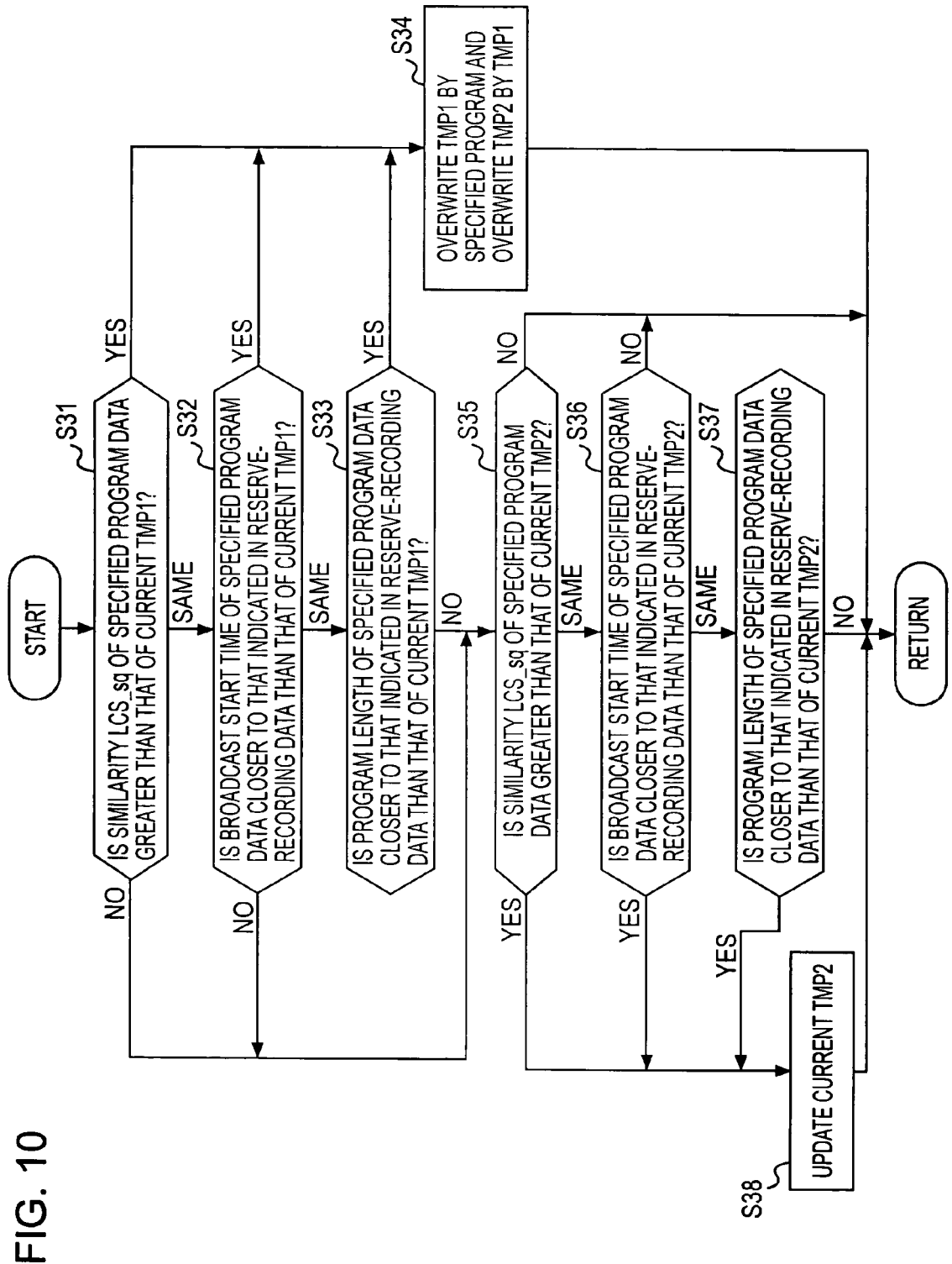
FIG. 10 is a flowchart illustrating two topmost selection processing in step S17 in FIG. 9.

The two topmost data selection processing in step S17 is discussed in detail below with reference to the flowchart of FIG. 10.

In step, S31, the reserve-recording changing unit 38 compares the similarity LCS_sq of the specified program data input from the title similarity calculator 37 with the similarity LCS_sq of the currently topmost program data TMP1. If the similarity LCS_sq of the program data input from the title similarity calculator 37 is greater than the similarity LCS_sq of the currently topmost program data TMP1, the process proceeds to step S34.

In step S34, the reserve-recording changing unit 38 updates the topmost program data TMP1 by the program data input from the title similarity calculator 37, and also updates the second topmost program data TMP2 by the topmost program data TMP1. The two topmost data selection processing is then completed.

If it is determined in step S31 that the similarity LCS_sq of the specified program data input from the title similarity calculator 37 is the same as the similarity LCS_sq of the currently topmost program data TMP1, the process proceeds to step S32.

In step S32, the reserve-recording changing unit 38 compares the difference between the broadcast start time indicated in the reserve-recording data and the broadcast start time indicated in the specified program data input from the title similarity calculator 37 with the difference between the broadcast start time indicated in the reserve-recording data and the broadcast start time indicated in the currently topmost program data TMP1. If the first difference is found to be smaller than the second difference, step S34 is executed.

If it is determined in step S32 that the two differences are the same, the process proceeds to step S33.

In step S33, the reserve-recording changing unit 38 compares the difference between the program length indicated in the reserve-recording data and the program length indicated in the specified program data input from the title similarity calculator 37 with the difference between the program length indicated in the reserve-recording data and the program length indicated in the topmost program data TMP1. If the program length is not indicated, it can be calculated from the broadcast start time and the broadcast end time. This is also applied to the subsequent description. If the first difference is found to be smaller than the second difference in step S33, step S34 is executed.

If it is found in step S33 that the first difference is not smaller than the second difference, the process proceeds to step S35.

As is seen from step S32 in which the difference in the start time is compared and from step S33 in which the difference in the program length is compared, priority is given to the case where the broadcast start time is not changed than the case where the program length is not changed. The reason for this is as follows. In the final episode of a program, for example, it is less likely that the broadcast start time is changed and it is more likely that the program length is changed.

If it is determined in step S31 that the similarity LCS_sq of the specified program data input from the title similarity calculator 37 is smaller than the similarity LCS_sq of the topmost program data TMP1, or if it is determined in step S32 that the difference between the broadcast start time indicated in the reserve-recording data and the broadcast start time indicated in the specified program data input from the title similarity calculator 37 is greater than the difference between the broadcast start time indicated in the reserve-recording data and the broadcast start time indicated in the topmost program data TMP1, the process proceeds to step S35.

In step S35, the reserve-recording changing unit 38 compares the similarity LCS_sq of the specified program data input from the title similarity calculator 37 with the similarity LCS_sq of the currently second topmost program data TMP2. If the similarity LCS_sq of the specified program data is found to be greater than the similarity LCS_sq of the second topmost program data TMP2, the process proceeds to step S38.

In step S38, the reserve-recording changing unit 38 overwrites the currently second topmost program data TMP2 by the specified program data input from the title similarity calculator 37, and the two topmost data selection processing is then completed.

If it is determined in step S35 that the similarity LCS_sq of the specified program data input from the title similarity calculator 37 is the same as the similarity LCS_sq of the second topmost program data TMP2, the process proceeds to step S36.

In step S36, the reserve-recording changing unit 38 compares the difference between the broadcast start time indicated in the reserve-recording data and the broadcast start time indicated in the specified program data input from the title similarity calculator 37 with the difference between the broadcast start time indicated in the reserve-recording data and the broadcast start time indicated in the second topmost program data TMP2. If the first difference is found to be smaller than the second difference, step S38 is executed.

If it is determined in step S36 that the two differences are the same, the process proceeds to step S37.

In step S37, the reserve-recording changing unit 38 compares the difference between the program length indicated in the reserve-recording data and the program length indicated in the specified program data input from the title similarity calculator 37 with the difference between the program length indicated in the reserve-recording data and the program length indicated in the second topmost program data TMP2. If the first difference is found to be smaller than the second difference in step S37, step S38 is executed.

If it is found in step S37 that the first difference is not smaller than the second difference, the two topmost data selection processing is terminated.

If it is determined in step S35 that the similarity LCS_sq of the specified program data input from the title similarity calculator 37 is smaller than the similarity LCS_sq of the second topmost program data TMP2, or if it is determined in step S36 that the difference between the broadcast start time indicated in the reserve-recording data and the broadcast start time indicated in the specified program data input from the title similarity calculator 37 is greater than the difference between the broadcast start time indicated in the reserve-recording data and the broadcast start time indicated in the second topmost program data TMP2, the two topmost data selection processing is terminated.

Instead of the above-described two topmost data selection processing, N topmost data selection processing may be performed, in which case, N topmost data can be selected.

Referring back to FIG. 9, after the two topmost data selection processing in step S17, the process returns to step S12, and step S12 and the subsequent steps are repeated. If it is determined in step S12 that all the program data have been specified, the process proceeds to step S18.

In the above-described two topmost data selection processing in step S17, the two topmost program data TMP1 and TMP2 are selected. However, if the similarity LCS_sq calculated in step S15 is found to be smaller than the predetermined threshold TH1 in step S16, neither of the topmost program data TMP1 or TMP2 may be selected, or only the topmost program data TMP1 may be selected.

Then, the reserve-recording changing unit 38 determines in step S18 whether the two topmost data TMP1 and TMP2 are available, i.e., whether the two topmost data TMP1 and TMP2 have been selected in step S17. If the topmost data TMP1 or TMP2 is not available, the process proceeds to step S19 to determine whether the topmost data TMP1 is available. If it is determined in step S19 that the topmost data TMP1 is not available, the processing in mode 1 is terminated. That is, the reserve-recording data is not changed.

If it is determined in step S19 that the topmost data TMP1 is available, the process proceeds to step S20. In step S20, the reserve-recording changing unit 38 changes the reserve-recording data on the basis of the topmost data TMP1. The processing in mode 1 is then completed.

If it is determined in step S18 that the two topmost data TMP1 and TMP2 are available, the process proceeds to step S21.

In step S21, the reserve-recording changing unit 38 discards the data between the two topmost data TMP1 and TMP2 that is smaller than or equal to a predetermined threshold TH2 (for example, 25% or smaller) of the program length indicated in the reserve-recording data. Because of this processing, it is possible to prevent programs whose program titles are similar to the program title of the program indicated in the reserve-recording data and whose program lengths are completely different from that of the program indicated in the reserve-recording data from being detected as the same program as that indicated in the reserve-recording data.

In step S22, the reserve-recording changing unit 38 determines whether only the topmost data TMP1 is available as a result of step S21. If so, step S20 is executed.

If it is determined in step S22 that the two topmost data TMP1 and TMP2 are still available, the process proceeds to step S23. In step S23, the reserve-recording changing unit 38 compares the difference between the broadcast start time indicated in the reserve-recording data and the broadcast start time indicated in the topmost data TMP1 with the difference between the broadcast start time indicated in the reserve-recording data and the broadcast start time indicated in the second topmost data TMP2. If the first difference is found to be smaller than the second difference, step S20 is executed.

If the first difference is found to be equal to the second difference in step S23, the process proceeds to step S24.

In step S24, the reserve-recording changing unit 38 compares the difference between the program length indicated in the reserve-recording data and the program length indicated in the topmost program data TMP1 with the difference between the program length indicated in the reserve-recording data and the program length indicated in the second topmost program data TMP2. If the first difference is found to be smaller than the second difference, step S20 is executed.

If the first difference is not smaller than the second difference in step S24, the process proceeds to step S25. In step S25, the reserve-recording changing unit 38 changes the reserve-recording data on the basis of the second topmost program data TMP2. The processing in mode 1 is then completed.

As is seen from step S23 in which the broadcast start time is compared and from step S24 in which the program length is compared, priority is given to the case where the broadcast start time is not changed than the case where the program length is not changed. Then, it is possible to prevent programs having a higher similarity LCS_sq but being different from the program of the reserve-recording data from being erroneously detected as the program of the reserve-recording data.

If it is determined in step S23 that the difference between the broadcast start time indicated in the reserve-recording data and the broadcast start time indicated in the topmost program data TMP1 is greater than the difference between the broadcast start time indicated in the reserve-recording data and the broadcast start time indicated in the second topmost program data TMP2, step S25 is executed by skipping step S24. The processing in mode 1 is then completed.

Figure 11:
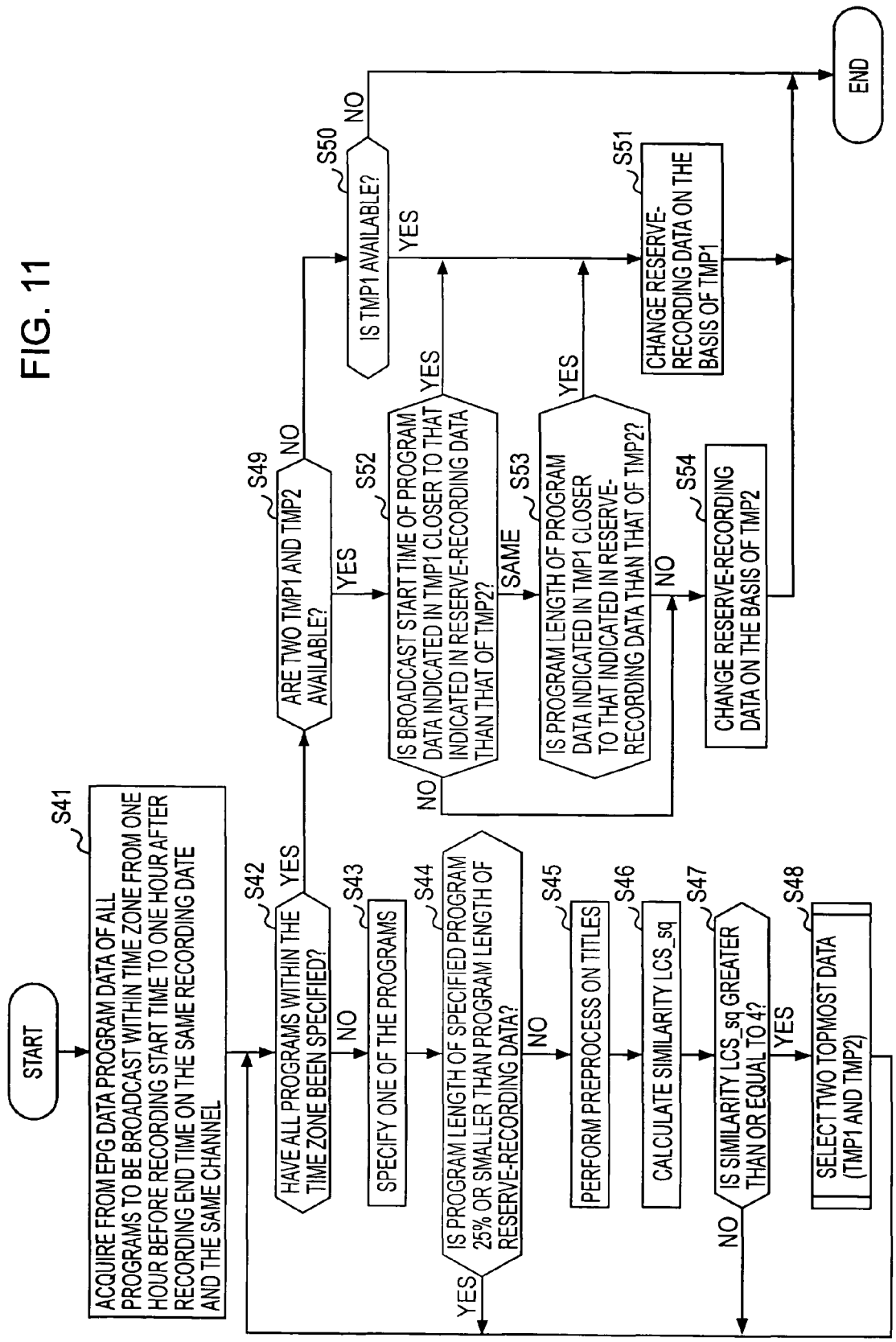
FIG. 11 is a flowchart illustrating processing in mode 2 in step S5 in FIG. 8.

Referring back to FIG. 8, a description is now given, with reference to FIG. 11, of processing in mode 2 in step S5 executed when it is determined in step S3 that a predetermined mark is not contained in the program title before being edited by the user.

In step S41, the title similarity calculator 37 acquires from the EPG data storage unit 36 program data of all programs to be broadcast on the same broadcast date and the same channel and within a time zone from a predetermined time (for example, one hour) before the recording start time indicated in the reserve-recording data after a predetermined time (for example, one hour) after the recording end time indicated in the reserve-recording data.

In step S42, the control unit 40 determines whether all the program data acquired in step S41 have been specified. If not all the program data have been specified, the process proceeds to step S43. In step S43, the control unit 40 specifies one of the unspecified program data.

In step S44, the title similarity calculator 37 determines whether the program length of the specified program data is smaller than or equal to a predetermined threshold TH3 (for example, 25% or smaller) of the program length indicated in the reserve-recording data. If the program length of the specified program data is found to be smaller than or equal to the predetermined threshold TH3, the process returns to step S42, and step S42 and the subsequent steps are repeated. If the program length of the specified program data is found to be greater than the predetermined threshold TH3, the process proceeds to step S45.

In step S45, the title similarity calculator 37 performs preprocess on the program title indicated in the reserve-recording data and the program title indicated in the specified program data. If the program title indicated in the reserve-recording data has been subjected to the title preprocess, the preprocess on the program title indicated in the reserve-recording data is omitted.

In step S46, the title similarity calculator 37 calculates the similarity LCS_sq between the preprocessed program title indicated in the reserve-recording data and the program title indicated in the specified program data. In step S47, the title similarity calculator 37 determines whether the calculated similarity LCS_sq is greater than or equal to a predetermined threshold TH4 (for example, 4). If the calculated similarity LCS_sq is smaller than the predetermined threshold TH4, the process returns to step S42.

If it is determined in step S47 that the calculated similarity LCS_sq is greater than or equal to the predetermined threshold TH4, the process proceeds to step S48. In step S48, the title similarity calculator 37 outputs, together with the specified program data, the calculated similarity LCS_sq to the reserve-recording changing unit 38. The reserve-recording changing unit 38 determines whether the similarity LCS_sq of the specified program data input from the title similarity calculator 37 is greater than that of the topmost data TMP1 or TMP2. If the similarity LCS_sq of the specified program data is greater than that of the topmost data TMP1 or TMP2, the reserve-recording changing unit 38 updates the corresponding topmost data TMP1 or TMP2 by the program data input from the title similarity calculator 37. In contrast, if the similarity LCS_sq of the specified program data is not greater than that of either of the two topmost data TMP1 and TMP2, the specified program data input from the title similarity calculator 37 is discarded. The two topmost selection processing executed in step S48 is similar to that indicated by the flowchart of FIG. 10, and an explanation thereof is thus omitted.

After the two topmost selection processing in step S48, the process returns to step S42. If it is determined in step S42 that all the program data have been specified, the process proceeds to step S49.

In the above-described two topmost data selection processing in step S48, the two topmost program data TMP1 and TMP2 are selected. However, if the similarity LCS_sq calculated in step S46 is found to be smaller than the predetermined threshold TH4 in step S47, neither of the topmost data TMP1 or TMP2 may be selected, or only the topmost program data TMP1 may be selected.

Then, the reserve-recording changing unit 38 determines in step S49 whether the two topmost data TMP1 and TMP2 are available, i.e., whether the two topmost data TMP1 and TMP2 have been selected in step S48. If the topmost data TMP1 or TMP2 is not available, the process proceeds to step S50 to determine whether the topmost data TMP1 is available. If it is determined in step S50 that the topmost data TMP1 is not available, the processing in mode 2 is terminated. That is, the reserve-recording data is not changed.

If it is determined in step S50 that the topmost data TMP1 is available, the process proceeds to step S51. In step S51, the reserve-recording changing unit 38 changes the reserve-recording data on the basis of the topmost data TMP1. The processing in mode 2 is then completed.

If it is determined in step S49 that the two topmost data TMP1 and TMP2 are available, the process proceeds to step S52. In step S52, the reserve-recording changing unit 38 compares the difference between the broadcast start time indicated in the reserve-recording data and the broadcast start time indicated in the topmost data TMP1 with the difference between the broadcast start time indicated in the reserve-recording data and the broadcast start time indicated in the second topmost data TMP2. If the first difference is found to be smaller than the second difference, step S51 is executed.

If the first difference is found to be equal to the second difference in step S52, the process proceeds to step S53.

In step S53, the reserve-recording changing unit 38 compares the difference between the program length indicated in the reserve-recording data and the program length indicated in the topmost program data TMP1 with the difference between the program length indicated in the reserve-recording data and the program length indicated in the second topmost program data TMP2. If the first difference is found to be smaller than the second difference, step S51 is executed.

If the first difference is not smaller than the second difference in step S53, the process proceeds to step S54. In step S54, the reserve-recording changing unit 38 changes the reserve-recording data on the basis of the second topmost program data TMP2. The processing in mode 2 is then completed.

If it is determined in step S52 that the difference between the broadcast start time indicated in the reserve-recording data and the broadcast start time indicated in the topmost program data TMP1 is greater than the difference between the broadcast start time indicated in the reserve-recording data and the broadcast start time indicated in the second topmost program data TMP2, step S54 is executed by skipping step S53. The processing in mode 2 is then completed.

As described above, according to the reserve-recording program tracking processing by the video recorder 1 of an embodiment of the present invention, the program data that is most likely to be the same as a record-reserved program is detected from the latest EPG data, and the reserve-recording data is updated on the basis of the detected program data. Thus, in response to any change in the broadcast time or the program length of a record-reserved program, the reserve-recording data can be updated.

Figure 12:
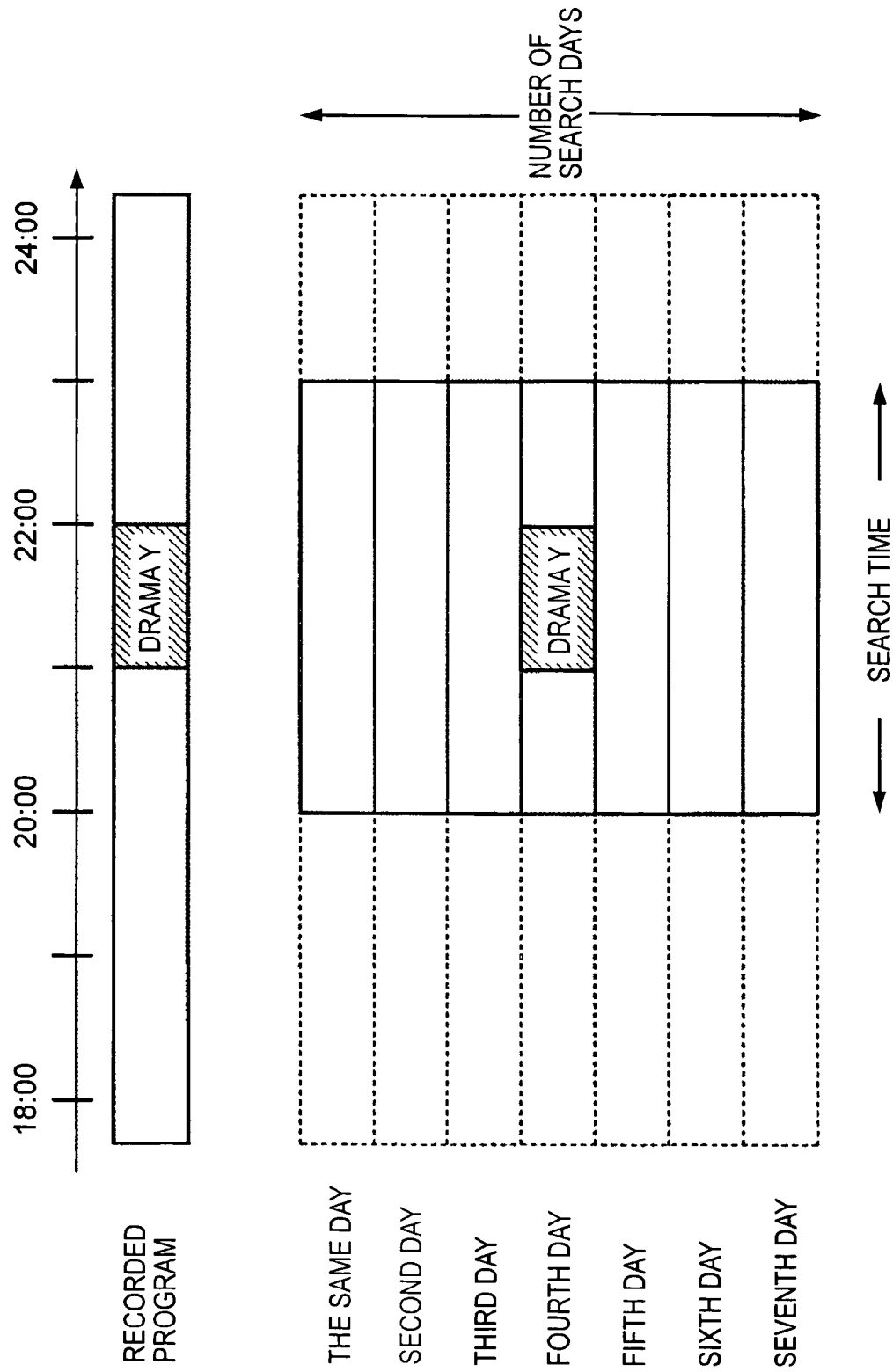
FIG. 12 illustrates an overview of subsequent reserve processing.
Figure 13:
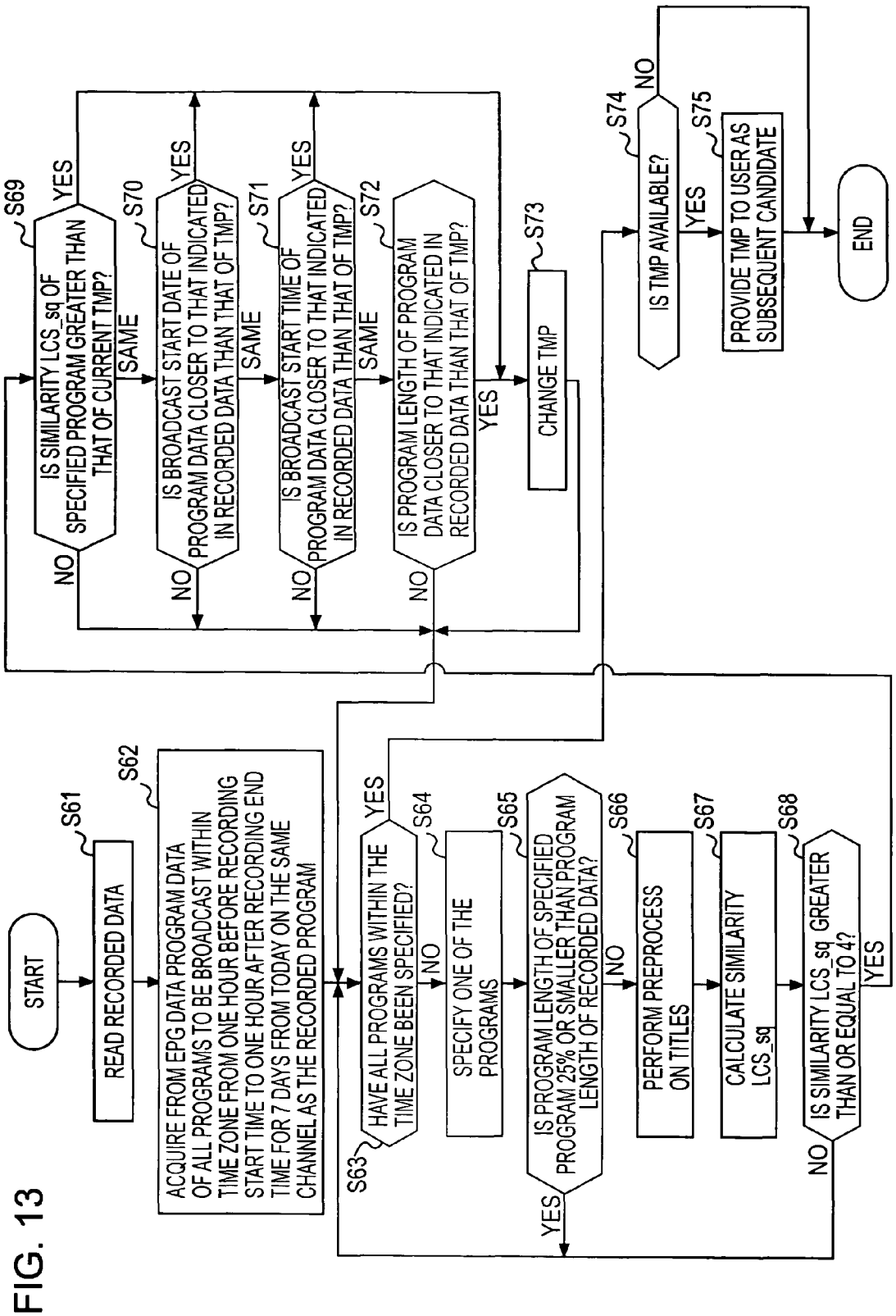
FIG. 13 is a flowchart illustrating the subsequent reserve processing.

The subsequent reserve processing is discussed below with reference to FIGS. 12 and 13. FIG. 12 illustrates an overview of sequential reserve recording. In the subsequent reserve processing, among recorded programs, the subsequent broadcasting of a recorded program selected by the user is searched for from the EPG data, and the searched program is shown to the user. For example, if the user selects the program "drama Y" broadcast and recorded from 21:00 to 22:00 of one day and provides an instruction to perform the subsequent reserve processing, the subsequent broadcasting of the program "drama Y" is searched for from the EPG data within predetermined search days (for example, 7 days) after the date on which the instruction is given and within a predetermined search time (for example, from 20:00 one hour before the broadcast start time to 23:00 one hour after the broadcast end time).

The subsequent reserve processing is described in detail below with reference to the flowchart of FIG. 13. This processing is started when the user selects a recorded program and provides an instruction to execute the subsequent reserve processing.

In step S61, the control unit 40 specifies the recorded data corresponding to one of the recorded programs selected by the user. The title acquisition unit 35 reads the specified recorded data from the recorded data storage unit 34 to acquire the program title of the recorded data.

In step S62, the title similarity calculator 37 acquires from the EPG data storage unit 36 program data of all programs to be broadcast on the same broadcast channel as that indicated in the recorded data and to be broadcast within a predetermined number of days (for example, 7 days) after the recording date within a time zone from a predetermined time (for example, one hour) before the recording start time indicated in the recorded data to a predetermined time (for example, one hour) after the recording end time indicated in the recorded data.

In step S63, the control unit 40 determines whether all the program data acquired in step S62 have been specified. If not all the program data have been specified, the process proceeds to step S64. In step S64, the control unit 40 specifies one of the unspecified program data.

In step S65, the title similarity calculator 37 determines whether the program length of the specified program data is smaller than or equal to a predetermined threshold TH5 (for example, 25% or smaller) of the program length of the recorded data. If the program length of the specified program data is found to be smaller than or equal to the predetermined threshold TH5, the process returns to step S63, and step S63 and the subsequent steps are repeated. If the program length of the specified program is found to be greater than the predetermined threshold TH5, the process proceeds to step S66.

In step S66, the title similarity calculator 37 performs preprocess on the program title indicated in the recorded data and the program title indicated in the specified program data. If the program title indicated in the recorded data has been subjected to the title preprocess, the preprocess on the program title indicated in the recorded data is omitted.

In step S67, the title similarity calculator 37 calculates the similarity LCS_sq between the preprocessed program title indicated in the recorded data and the program title indicated in the specified program data. In step S68, the title similarity calculator 37 determines whether the calculated similarity LCS_sq is greater than or equal to a predetermined threshold TH6 (for example, 4). If the calculated similarity LCS_sq is smaller than the predetermined threshold TH6, the process returns to step S63. If the calculated similarity LCS_sq is found to be greater than or equal to the predetermined threshold TH6, the process proceeds to step S69.

In step S69, the title similarity calculator 37 outputs the program data having similarity LCS_sq that is found to be greater than or equal to the predetermined threshold TH6 to the recording candidate selector 39. The recording candidate selector 39 then determines whether the similarity LCS_sq of the program data input from the title similarity calculator 37 is greater than the similarity LCS_sq of the currently topmost program data TMP.

If the similarity LCS_sq of the program data input from the title similarity calculator 37 is found to be greater than the similarity LCS_sq of the currently topmost data TMP, the process proceeds to step S73. If the topmost data TMP does not exist, the process also proceeds to step S73. In step S73, the recording candidate selector 39 updates the topmost data TMP by the program data input from the title similarity calculator 37. The process then returns to step S63.

If it is determined in step S69 that the similarity LCS_sq of the program data input from the title similarity calculator 37 is smaller than the similarity LCS_sq of the topmost program data TMP, the process returns to step S63. In this case, the topmost program data TMP is not updated.

If the similarity LCS_sq of the program data input from the title similarity calculator 37 is found to be equal to the similarity LCS_sq of the topmost program data TMP in step S69, the process proceeds to step S70.

In step S70, the recording candidate selector 39 compares the difference between the broadcast date of the recorded data and the broadcast date of the program data input from the title similarity calculator 37 with the difference between the broadcast date of the recorded data with the broadcast date of the topmost program data TMP.

If the first difference is found to be smaller than the second difference in step S70, the process proceeds to step S73. In step S73, the topmost program data TMP is updated by the program data input from the title similarity calculator 37. Then, the process returns to step S63.

If the first difference is found to be greater than the second difference in step S70, the process returns to step S63. In this case, the topmost program data TMP is not updated.

If the first difference is found to be equal to the second difference in step S70, the process proceeds to step S71.

In step S71, the recording candidate selector 39 compares the difference between the recording start time of the recorded data and the broadcast start time of the program data input from the title similarity calculator 37 with the difference between the recording start time of the recorded data with the broadcast start time of the topmost program data TMP.

If the first difference is found to be smaller than the second difference in step S71, the process proceeds to step S73. In step S73, the topmost program data TMP is updated by the program data input from the title similarity calculator 37. Then, the process returns to step S63.

If the first difference is found to be greater than the second difference in step S71, the process returns to step S63. In this case, the topmost program data TMP is not updated.

If the first difference is found to be equal to the second difference, the process proceeds to step S72.

In step S72, the recording candidate selector 39 compares the difference between the program length of the recorded data and the program length of the program data input from the title similarity calculator 37 with the difference between the program length of the recorded data and the program length of the topmost program data TMP.

If the first difference is found to be smaller than the second difference in step S72, the process proceeds to step S73 in which the topmost program data TMP is updated by the program data input from the title similarity calculator 37. Then, the process returns to step S63.

If it is determined in step S72 that the first difference is not smaller than the second difference, the process returns to step S63. In this case, the topmost program data TMP is not updated.

If it is determined in step S63 that all the program data have been specified, the process proceeds to step S74.

In step S74, the recording candidate selector 39 determines whether the topmost program data TMP is available. If the topmost program data TMP is available, the process proceeds to step S75. In step S75, the recording candidate selector 39 provides the topmost program data TMP to the user as the candidate of the subsequent broadcasting program of the recorded data. In response to a predetermined operation input from the user in accordance with the provision of the candidate, the topmost program data TMP is supplied from the recording candidate selector 39 to the reserve-recording setting unit 3 to set a recording reservation.

If it is determined in step S74 that the topmost program data TMP is not available, step S75 is skipped, and the subsequent reserve processing is completed.

As is seen from the foregoing description, according to the subsequent reserve processing by the video recorder 1 of an embodiment of the present invention, the topmost program data TMP that is most likely to be the subsequent broadcasting program of the recorded program can be detected from the latest EPG data. This can prevent the situation in which the user forgets to set the recording reservation, thereby enhancing the usability.

Although in the above-described subsequent reserve processing the topmost program data that is most likely to be the subsequent broadcasting program is provided to the user, N topmost program data may be detected and provided to the user.

The above-described series of processing may be executed by hardware or software. If software is used, a corresponding software program is installed from a recording medium into a computer built in dedicated hardware or a computer that can execute various functions by installing various programs therein.

The program allowing a computer to execute the above-described series of processing is supplied to the computer while being stored in a recording medium and is loaded to a random access memory (RAM).

In this specification, steps forming the program may be executed in chronological order described in the specification or may be executed concurrently or individually.

The program may be executed by a single computer or may be executed in a distributed manner by a plurality of computers. Alternatively, the program may be transferred to a remote computer and is then executed.

It should be understood by those skilled in the art that various modifications, combinations, sub-combinations and alterations may occur depending on design requirements and other factors insofar as they are within the scope of the appended claims or the equivalents thereof.

What is claimed is:

1. A recording control apparatus for controlling the recording of content of a broadcast program, comprising:
   acquisition means for acquiring electronic program guide data concerning the broadcast program, the electronic program guide data indicating a program guide title of the broadcast program;
   detection means for detecting a recorded title of the broadcast program from reserve-recording data indicating a recording reservation of the broadcast program;
   calculation means for calculating, within a predetermined number of days before the broadcast program is broadcast, and, within each day of the predetermined number of days, for a time period, a similarity between the recorded title of the broadcast program and the program guide title of the broadcast program, wherein:

the similarity is calculated by comparing characters or syllables comprising individual parts of words included in the recorded title and the program guide title, and the time period starts at a first predetermined time before a time that the broadcast program is scheduled to start, and the time period ends at a second predetermined time after a time that the broadcast program is scheduled to end; and changing means for determining whether the broadcast time of the broadcast program has changed based on the similarity calculated by the calculation means, and for changing the reserve recording data to reflect the change to the broadcast time.

2. The recording control apparatus according to claim 1, wherein the calculation means calculates the similarity on the basis of a longest common subsequence length of the characters or syllables in the program guide title of the broadcast program and the recorded title of the broadcast program, the longest common subsequence length corresponding to a number of consecutive characters or syllables included in both in the program guide title of the broadcast program and the recorded title of the broadcast program.

3. The recording control apparatus according to claim 1, wherein the calculation means calculates, as the similarity, the square sum of longest common subsequence lengths of the characters or syllables in the program guide title and the recorded title.

4. The recording control apparatus according to claim 1, wherein the calculation means calculates the similarity so that the similarity becomes greater as the longest common subsequence length of the characters or syllables in the program guide title and the recorded title becomes longer.

5. The recording control apparatus according to claim 1, wherein the calculation means calculates the similarity immediately before a broadcast date of the broadcast program indicated in the reserve-recording data.

6. The recording control apparatus according to claim 1, wherein the calculation means calculates the similarity after performing a preprocess for removing a predetermined character from the recorded title and the program guide title of the broadcast program or for converting the predetermined character into another character.

7. The recording control apparatus according to claim 1, wherein the changing means changes the reserve-recording data by using the electronic program guide data on the basis of at least one of the differences in the broadcast start time and in the program length between the broadcast program indicated in the reserve-recording data and the broadcast program indicated in the electronic program guide data.

8. The recording control apparatus according to claim 1, wherein the changing means changes the reserve-recording data when the similarity calculated by the calculation means is greater than or equal to a predetermined value.

9. The recording control apparatus according to claim 1, wherein the detection means also detects a title of a recorded broadcast program.

10. The recording control apparatus according to claim 9, further comprising:

selection means for selecting a broadcast program related to the recorded broadcast program on the basis of the similarity calculated by the calculation means; and generation means for generating reserve-recording data indicating a recording reservation of the broadcast program selected by the selection means.

11. The recording control apparatus according to claim 10, wherein the selection means selects the broadcast program related to the recorded broadcast program on the basis of at least one of the differences in the broadcast date, the broadcast stark time, and the program length between the recorded broadcast program and the broadcast program indicated in the electronic program guide data.

12. A recording control method for controlling the recording of content of a broadcast program, comprising the steps implemented by a computer of:

acquiring electronic program guide data concerning the broadcast program, the electronic program guide data indicating a program guide title of the broadcast program;

detecting a recorded title of the broadcast program from reserve-recording data indicating a recording reservation of the broadcast program;

calculating, within a predetermined number of days before the broadcast program is broadcast, and, within each day of the predetermined number of day for a time period, a similarity between the recorded title of the broadcast program and the program guide title of the broadcast program, wherein:

the similarity is calculated by comparing characters or syllables comprising individual parts of words included in the recorded title and the program guide title, and the time period starts at a first predetermined time before a time that the broadcast program is scheduled to start, and the time period ends at a second predetermined time after a time that the broadcast program is scheduled to end;

determining whether the broadcast time of the broadcast program has changed based on the calculated similarity; and changing the reserve recording data to reflect the change to the broadcast time.

13. A non-transitory, computer-readable storage medium storing a program that, when executed by a processor of a computer, causes the computer to perform a method for controlling the recording of content of a broadcast program, the method comprising:

acquiring electronic program guide data concerning the broadcast program, the electronic program guide data indicating a program guide title of the broadcast program;

detecting a recorded title of the broadcast program from reserve-recording data indicating a recording reservation of the broadcast program;

calculating, within a predetermined number of days before the broadcast program broadcast, and, within each day of the predetermined number of days, for a time period, a similarity between the recorded title of the broadcast program and the program guide title of the broadcast program, wherein:

the similarity is calculated by comparing characters or syllables comprising individual parts of words included in the recorded title and the program guide title, and the time period starts at a first redetermined time before a time that the broadcast program is scheduled to start, and the time period ends at a second predetermined time after a time that the broadcast program is scheduled to end;

determining whether the broadcast time of the broadcast program has changed based on the calculated similarity; and changing the reserve recording data to reflect the change to the broadcast time.

14. A recording control apparatus for controlling the recording of content of a broadcast program, comprising:

an acquisition unit configured to acquire electronic program guide data concerning the broadcast program, the electronic program guide data indicating a program guide title of the broadcast program;

a detector configured to detect a recorded title of the broadcast program from reserve-recording data indicating a recording reservation of the broadcast program;

a calculator configured to calculate, within a predetermined number of days before the broadcast program is broadcast, and, within each day of the predetermined number of days, for a time period, a similarity between the recorded title of the broadcast program and the program guide title of the broadcast program, wherein:

the similarity is calculated by comparing characters or syllables comprising individual parts of words included in the recorded title and the program guide title, and the time period starts first predetermined time before a time that the broadcast program is scheduled to start, and the time period ends at a second predetermined time after a time that the broadcast program is scheduled to end; and a changing unit configured to determine whether the broadcast time of the broadcast program has changed based on the similarity calculated by the calculator, and change the reserve recording data to reflect the change to the broadcast time.

* * * * *